US005475520A

United States Patent [19]
Wissinger

[11] Patent Number: 5,475,520
[45] Date of Patent: Dec. 12, 1995

[54] SATELLITE COMMUNICATIONS SYSTEM

[75] Inventor: Alan B. Wissinger, Wilton, Conn.

[73] Assignee: Hughes Aircraft Company, Los Angeles, Calif.

[21] Appl. No.: 263,843

[22] Filed: Jun. 22, 1994

[51] Int. Cl.⁶ ................................................ H04B 10/00
[52] U.S. Cl. ...................... 359/172; 359/152; 359/159; 455/12.1; 342/354
[58] Field of Search ..................................... 359/152, 159, 359/166, 168, 169–170, 172–173; 455/12.1; 342/354; 356/152.1

[56] References Cited

U.S. PATENT DOCUMENTS

| 3,511,998 | 5/1970 | Smokler | 359/159 |
| 4,867,560 | 9/1989 | Kunitsuzu | 359/159 |
| 5,060,304 | 10/1991 | Solinsky | 359/152 |
| 5,119,225 | 6/1992 | Grant et al. | 359/172 |
| 5,282,073 | 1/1994 | Defour et al. | 359/152 |

OTHER PUBLICATIONS

Hemmati et al., "Laser Transmitter Aims at Laser Beacon" NASA Tech Briefs, Nov. 1993.

Primary Examiner—Leo H. Boudreau
Assistant Examiner—Kinfe-Michael Negash
Attorney, Agent, or Firm—W. C. Schubert; W. K. Denson-Low

[57] ABSTRACT

A satellite communications system. The inventive system (10) includes an arrangement (11) disposed on a first satellite for transmitting a plurality of unidirectional beams of electromagnetic radiation (32, 34, 36 and 38). Each beam is transmitted by an optical fiber (22, 24, 26 and 28) and has a unique modulation and a known coverage area. At least one of the beams (34) is received by a remote satellite receiver (30) which retransmits a signal with the modulation of the received beam. The retransmitted signal is received at the first satellite and the modulation thereon is extracted to identify which beam was received by the remote satellite. This information is used to change the coverage of the transmitted beams until the remote satellite detects all of the transmitted beams. At this point, data communication in the normal course may be effected.

11 Claims, 6 Drawing Sheets

SATELLITE COMMUNICATIONS SYSTEM

BACKGROUND OF THE INVENTION

1. Field of the Invention

The present invention relates to satellite to satellite communication systems. More specifically, the present invention relates to acquisition and tracking systems for satellite to satellite communication systems.

2. Description of the Related Art

In certain applications, satellite to satellite communication is necessary in order to complete a communication link to a ground station. Communication satellite cross-links are currently provided by radio-frequency (RF) transceivers.

While RF technology is technically mature, these systems suffer from certain shortcomings. One shortcoming results from the fact that some RF systems are generally simplex systems allowing communication in one direction at a time. Duplex systems are generally much more costly than simplex systems and are therefore currently of limited application.

In addition, the frequencies available for RF satellite communication are currently very limited. To the extent that a frequency band is available, governmental licenses may be required.

Finally, RF systems have limited rates for data transmission.

High data rate station-to-station optical communication through free space is afforded by the use of a very narrow optical beam. Optical beams of sufficient brightness are typically tens of microradians in diameter, while the corresponding requirement for RF beamwidths is generally on the order of one to two degrees. Acquisition and tracking of the beam is problematic in that the beam must be pointed at a remote transceiver with microradian accuracy.

Prior optical communications concepts embodied power consuming optical beacons for initial acquisition. An alternative approach involved the scanning of a diffraction limited transmit beam over the region of pointing uncertainty in order to illuminate the remote transceiver. Since the narrow angle transmit beam of both transceivers must be scanned and finally co-aligned (while taking into account the point-ahead angle), the acquisition process was time consuming, to the detriment of the revenue-bearing data stream.

In addition, prior concepts embodied the idea of each transceiver autonomously tracking the image of the other's transmit beam. Many proposed optical communications systems incorporate an expensive charge coupled device (CCD) image sensor or an image-splitting device followed by a quadrant detector. (See "lightweight Lasercomm Terminal Concept for LEO Orbit Satellite Constellations"; Marshalek, Begley; Ball Aerospace Systems Group-Paper 2123-18, OE/LASE '94, 22–29 Jan. 1994 and "Laser Transmitter Aims at Laser Beacon", Hemmati, Lesh; NASA Tech Briefs, November, 1993.) Since the dynamic range of the pointing error is large (1,000:1), a single-stage tracker is not feasible, especially when the communication data rates are considered. Therefore, a coarse-fine implementation with dual detector complements has heretofore been the usual approach. However, these systems are typically complicated and expensive.

Thus, there has been a need in the art for an inexpensive system for effecting acquisition and tracking of an optical beam.

SUMMARY OF THE INVENTION

The need in the art is addressed by the present invention which provides a satellite communications system. In a most general sense, the inventive system includes an arrangement disposed on a first satellite for transmitting a plurality of unidirectional beams of electromagnetic radiation. Each beam has a known coverage area and a unique characteristic relative to any other transmitted beam. In a specific embodiment, each beam is transmitted by an optical fiber and collimating lens and has a unique modulation. At least one of the beams is received by a remote satellite receiver which retransmits a signal having the modulation of the received beam. The retransmitted signal is received at the first satellite and the modulation thereon is extracted to identify which beam was received by the remote satellite. This information is used to change the coverage of the transmitted beams until the remote satellite detects all of the transmitted beams. At this point, data communication may be effected in the normal course.

The multiple transmitted beams are defocused to provide a beacon with a wide coverage area. The invention allows for short acquisition times. Only a single detector is required in each receiver as the pointing direction is encoded in the transmitted beams. The transmission of multiple beams allows for potentially higher data rates. Acquisition is accomplished by translating the fibers in the focal plane of the collimating lens rather than by scanning one or more mirrors in the optical train.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
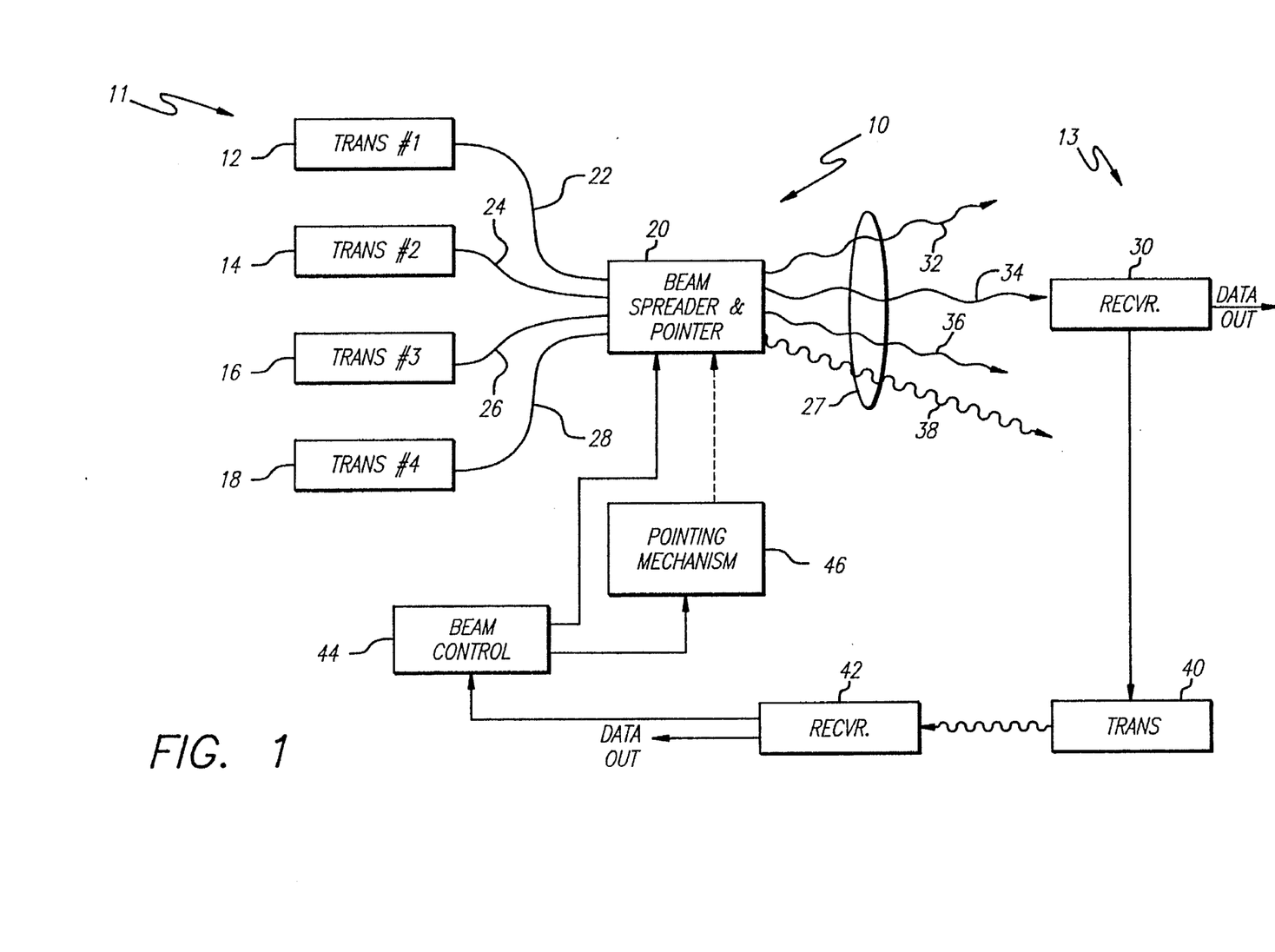
FIG. 1 is a simplified block diagram of an illustrative implementation of the satellite communication system of the present invention.

FIG. 1 is a block diagram of a illustrative implementation of the satellite communication system of the present invention. The system 10 includes a first transceiver 11 on a first satellite (not shown) and a second transceiver 13 on a remote second satellite (not shown). In the preferred embodiment, the transceiver 13 is implemented in the same manner as the transceiver 11 of the first satellite. The first transceiver 11 includes first, second, third and fourth laser transmitters 12, 14, 16 and 18, respectively. Each of the transmitters operates with a unique modulation. The laser transmitters may be implemented with four diodes in a single SOT-148 package such as the model SDL-5600 sold by Spectra Diode Labs. In the alternative, individual laser diodes may be used as transmitters.

Each transmitter 12, 14, 16 and 18 is mechanically coupled to a beam spreader 20 via an associated optical fiber 22, 24 26, and 28. The beam spreader 20 provides fine focus and pointing control of the composite beam by precise positioning of each of the optical fibers 12, 14, 16 and 18 as discussed more fully below. Each optical fiber outputs a beam that is collimated by a common lens 27 to cover an area of a predetermined region of uncertainty so that the entire region is covered by at least one beam. Thus, a remote satellite receiver 30 located within the region of uncertainty receives at least one of the beams 32, 34, 36 and 38 output by the fibers 22, 24, 26 and 28 respectively. The receiver 30 detects the modulation of the received beam 34 and communicates this signal to an associated transmitter 40.

As illustrated in FIG. 1, in the preferred embodiment, the transmitter 40 has four fibers which, in the acquisition mode, each output a beam having a unique modulation. On receipt of a beam by the receiver 30 and communication of the modulation of same to the transmitter 40, the transmitter 40 changes the modulation of each of its output beams to match that of the received beam 34. This signal is detected by a receiver 42 located on the first satellite which is located within the pointing uncertainty region of the transceiver 13 of the remote satellite. The modulation of the received beam is provided to a beam control unit 44. The beam control unit 44 adjusts the pointing angle and focus of the composite beam through a pointing mechanism 46 and the beam spreader 20.

Figure 2:
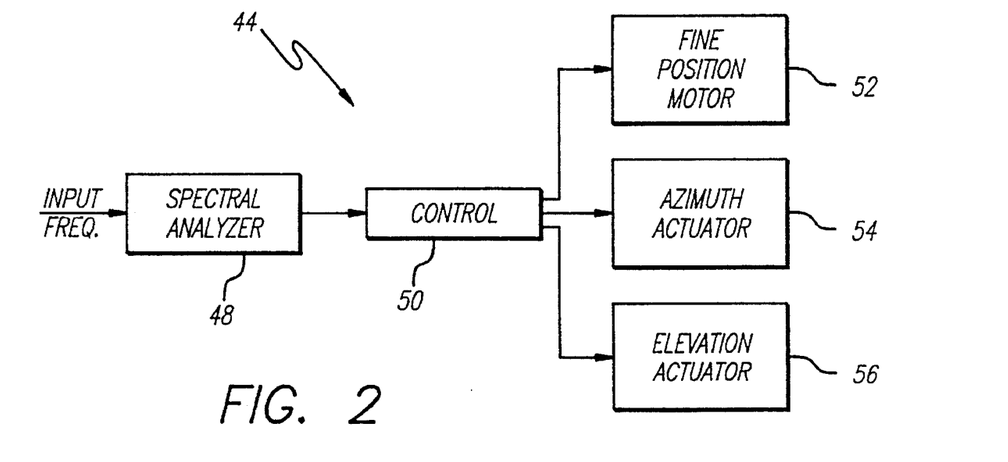
FIG. 2 is a block diagram of an illustrative implementation of the beam control unit of the satellite communication system of the present invention.

FIG. 2 is a block diagram of an illustrative implementation of the beam control unit 44. The beam control mechanism 44 includes a spectral analyzer 48 and a control unit 50. The spectral analyzer outputs a signal which indicates the modulation of the beam detected by the receiver 42. The spectral analyzer may not be required if the receiver 42 outputs a signal indicative of the modulation of the received beam which could be used by the control unit 50 directly. The control unit 50 may be implemented with a microprocessor, a programmable logic array or with digital logic. The control unit 50 provides activation signals to a focus (fine) position motor 52 of the beam spreader and pointer 20, an azimuth (coarse pan) position activator 54 and an elevation (coarse tilt) position activator 56 of the coarse positioning mechanism 46. The azimuth and elevation position activators 54 and 56 may be implemented with stepper motors.

Figure 3:
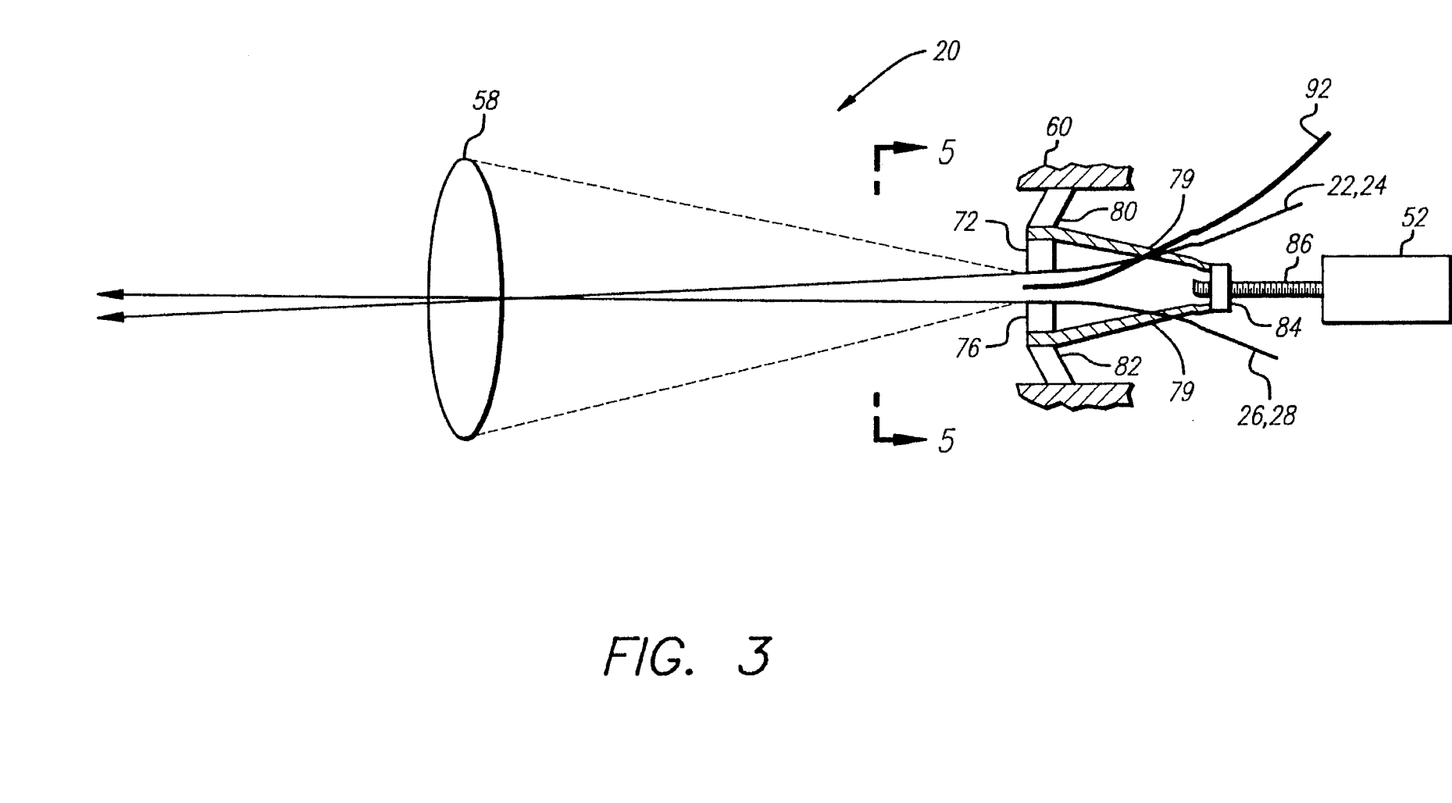
FIG. 3 is a simplified side view of an illustrative implementation of the beam spreader and pointer of the satellite communication system of the present invention.

FIG. 3 is a simplified side view of an illustrative implementation of the beam spreader and pointer 20 of the present invention. The beam spreader 20 includes the fine positioning motor 52, a beam spreading mechanism 60 and a transmitter lens 58.

Figure 4:
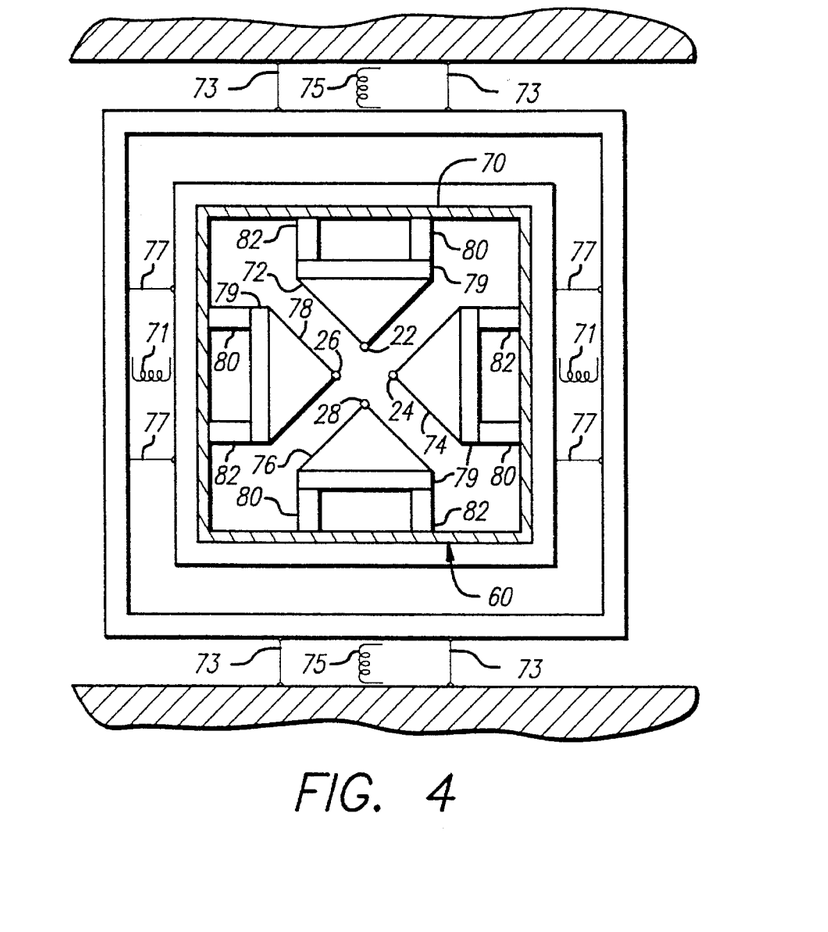
FIG. 4 is a front view of illustrative embodiments of the coarse and fine beam pointing and spreading mechanisms of the present invention.

FIG. 4 is a front view of illustrative embodiments of the coarse and fine beam pointing and spreading mechanisms of the present invention. As shown in FIG. 4, the beam spreading mechanism 60 is supported by a two-direction translation mechanism 62. The direction of the outgoing beams is controlled by translating the ends of the fibers in a direction perpendicular to the optical axis of the lens. The fibers 22, 24, 26, and 28 should be aimed roughly at the transmitting lens (not shown). The only requirement is that the beams from the fibers be smaller than the lens diameter and that they remain within the clear aperture of the lens. The translation mechanism 62 is a precision two-axis cross slide that provides for pointing in the elevation and azimuth directions. Actuation can be electromagnetic using loudspeaker coils 71, 75 or stepper motors (not shown). The suspension for the cross slide is provided by the flexure sets 73 and 77.

The beam spreading mechanism 60 includes a square frame 70 within which a plurality of triangular supports 72, 74, 76 and 78 are disposed. Each of the optical fibers 22, 24, 26 and 28 is mounted on the inner surface of an associated triangular support 72, 74, 76 and 78, respectively. As shown in FIG. 3, each triangular support is attached to the fine positioning motor 52 by a flexible blade 79. Each blade 79 has an aperture therethrough through which the optical fiber feeds. In FIG. 3, two of the blades 79 are removed to show how the optical fibers seat on the triangular supports. As shown in FIGS. 3 and 4, each blade 79 is connected to the frame 70 by a pair of legs 80 and 82. Each of the legs 80 and 82 is also flexible. Each blade 79 is connected to a threaded collar 84. The threaded collar is disposed on a threaded shaft 86 which is rotated by the fine position motor 52.

Figure 5:
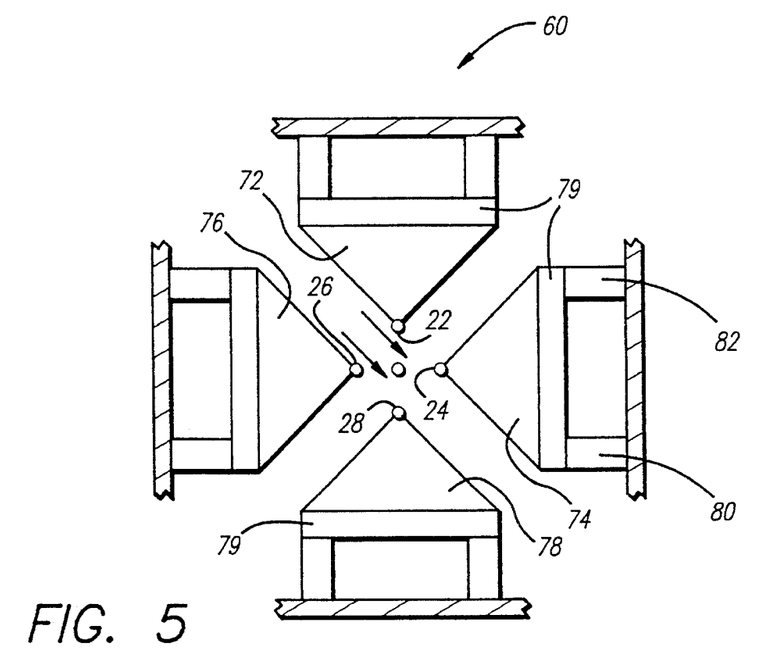
FIG. 5 is front view of the beam spreading mechanism in an open position.
Figure 6:
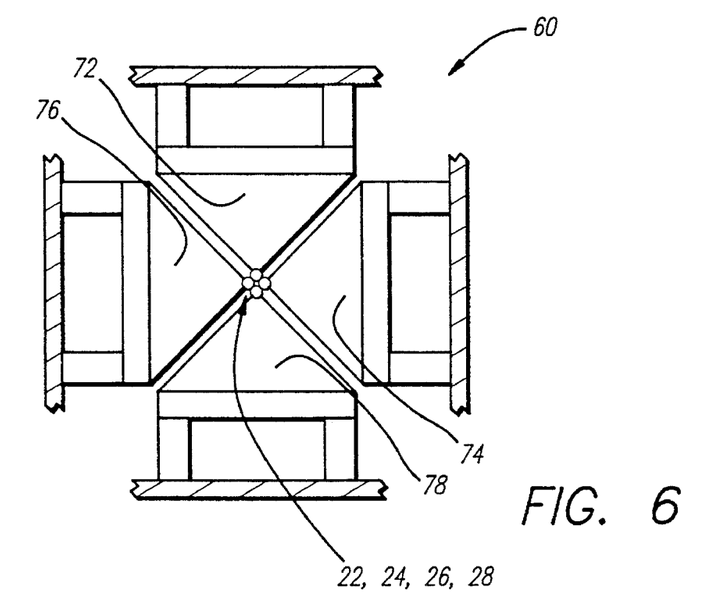
FIG. 6 is a front view of the beam spreading mechanism in a closed position.

Activation of the fine positioning motor 52 is effective to cause the beam spreading mechanism 60 to open and close as illustrated in FIGS. 5 and 6 respectively. FIG. 5 is front view of the beam spreading mechanism 60 in an open position. FIG. 6 is a front view of the beam spreading mechanism in a closed position. Thus, the pointing angle of each output beam and therefore the focus of the composite beam are controlled by the fine positioning motor 52.

Figure 7:
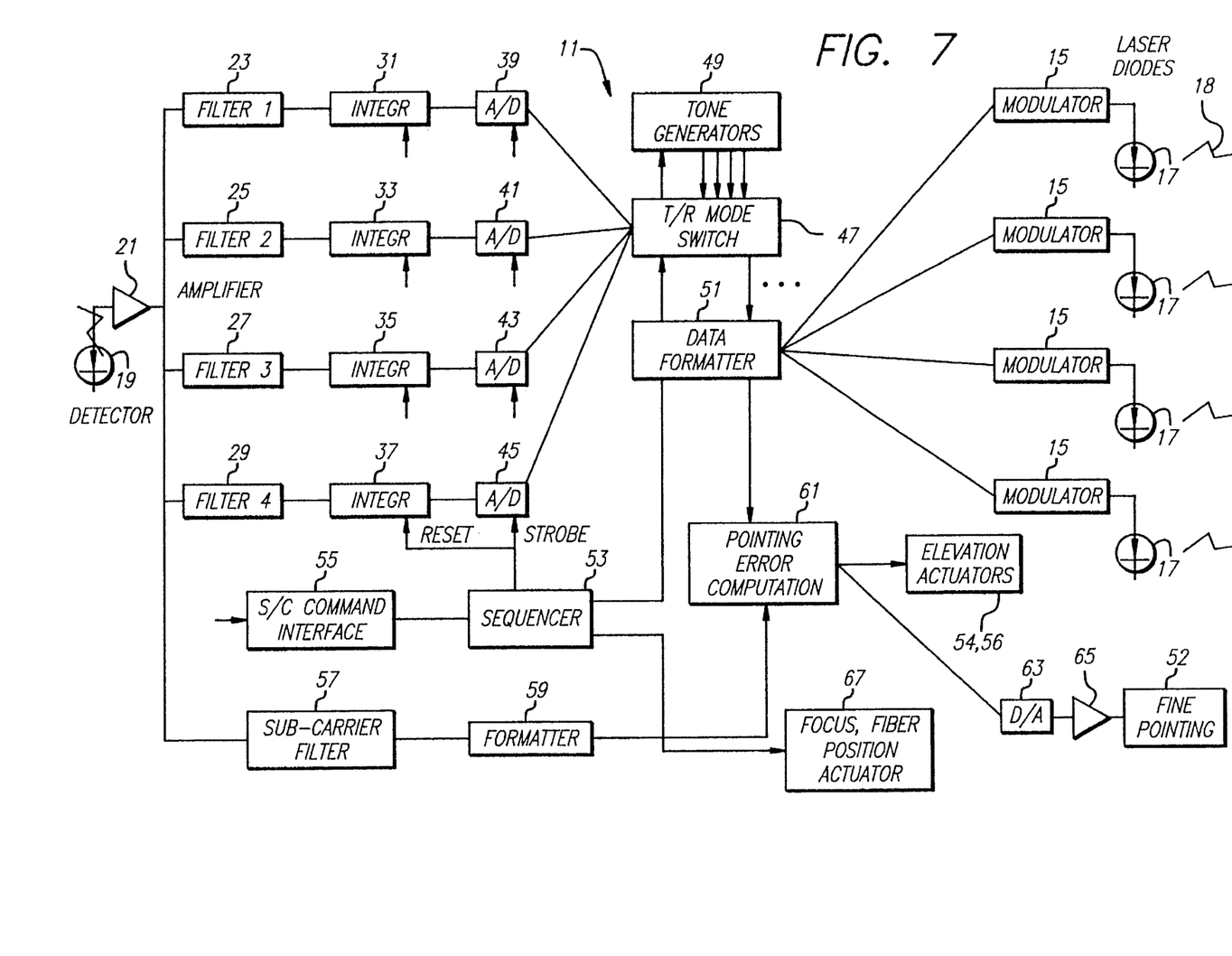
FIG. 7 is a detailed block diagram of an illustrative implementation of the first transceiver of the satellite communication system of the present invention.

FIG. 7 is a detailed block diagram of an illustrative implementation of the first transceiver 11 of the satellite communication system of the present invention. Acquisition is initiated by a command received through the spacecraft command interface 55. The command controls the pointing of the gimbals through the azimuth and elevation activators 54 and 56. Each of the transmitters 12, 14, 16, and 18 is implemented with a modulator 15 and a laser diode 17o Tones for the modulators 15 are generated by a tone generator 49. Each modulator 15 provides a different modulation to the associated laser diode as discussed above. An optical detector 19 in the receiver 42 receives the retransmitted beam which is amplified by amplifier 21. The amplifier output is filtered by four unique filters to extract the modulation of the received signal. The filter outputs are rectified and integrated before being input to analog-to-digital (A/D) converters 39–45 (odd numbers only). After a suitable integration time determined by a sequencer 53, the A/Ds are strobed and four digital words (four bits each), indicative of the relative intensity of the four output beam footprints relative to the receiver's location, are passed to the T/R mode switch 47 where they are momentarily stored. The mode switch 47 enters the "receive" mode at this time. The four digital words are formatted in a prescribed serial sequence in the data formatter 51. The resulting sequence of digital words simultaneously modulates four sub-carrier tones which are added to all four of the basic tones that drive the modulators 15 and excite all of the laser diodes 17. The four beams 18 now contain the information needed to refine the pointing direction at the remote transceiver 13.

When the coded information is detected and amplified, a sub-carrier filter 57 separates the coded digital information from the basic beam identification tones. The digital code is recovered in the formatter 59 and passed to the pointing error computation circuit 61. The digital code representing the relative intensity of the beams at the remote terminal is used to control the activators 54 and 56 and the fine position motor 52. After an appropriate settling time, the sequencer 53 activates the beam spreader and pointer 20 and the cycle is repeated in accordance with the method of operation discussed below. The cycle time may be accelerated by triggering it on the output of the integrator with the highest value.

Figure 8A:
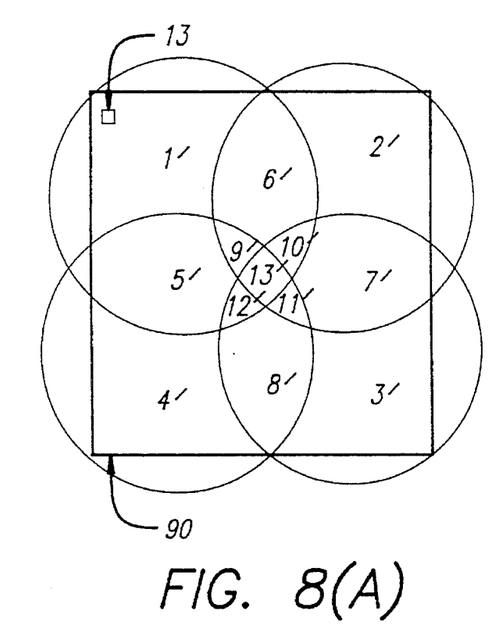
FIG. 8(A)–(D) depict the change in beam coverage effected by the present invention.
Figure 8B:
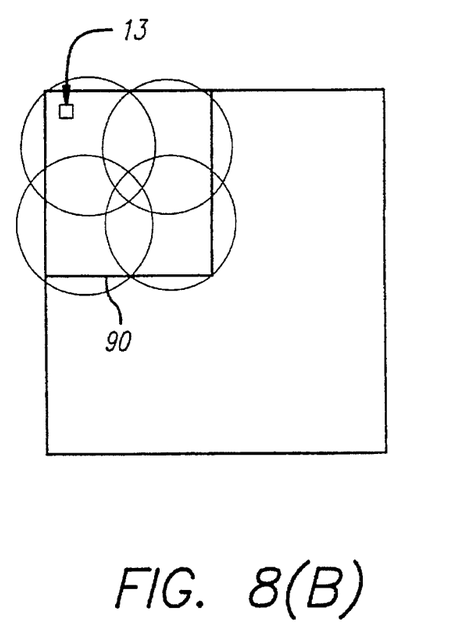
Figure 8C:
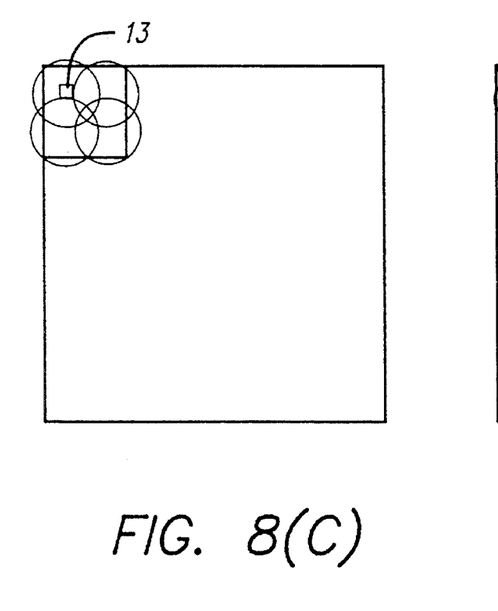
Figure 8D:
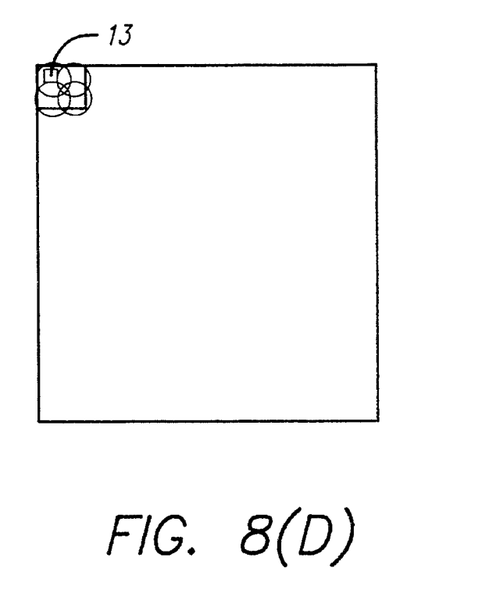

In operation, at the start of the acquisition process, the fibers are arranged to project four defocused but slightly overlapping beams, the centers of which form the corners of a square pattern as illustrated in FIG. 8(A). Each of the beams 32, 34, 36 and 38 provides one of the coverage patterns 1', 2', 3', and 4'. The beams cover an initial pointing uncertainty region 90. The areas 5', 6', 7', and 8' are areas of overlap of two beams Areas 9', 10', 11' and 12' are areas in which three beams overlap and the area 13' is the region where all four beams overlap. In the areas of overlap, optical energy of the overlapping beams is present. The remote transceiver 13 is located within the coverage area 1' of one of the beams, beam 34 for example. After a suitable reception time, the transceiver 13 detects the modulation of the beam 34 and modulates each of its output beams with the same modulation. This signal is received and decoded in the manner described above, and the pointing angles and the focus of the four beams are changed to cover the region initially covered by the beam 34. (Focus control is effected by moving the fiber toward the focal plane of the lens 27 in FIG. 1 or the lens 58 in FIG. 3. The output beam will become more and more collimated and the beam spread will reduce until it is diffraction limited.) This process is repeated as illustrated in FIGS. 8(B)–8(D) until a best focus and minimum beam deployment are achieved.

In a tracking mode, the combination of identifiers are sent back via the communicating beams to perform closed loop tracking. The data from the remote receiver 13 is used to correct the pointing of the transmitter 11. The closed loop feedback path is then effected via the communications channel. If the communications channel can not be used, a fifth optical fiber 92 coupled to a separate laser diode (not shown) could be used. The fifth, optional optical fiber 92 is shown in FIG. 3. In this case, the four beams used for used for tracking would operate at one wavelength and the data beam would operate at a second wavelength and a dichroic beam splitter and a separate detector (not shown) would serve as the data receiver. During acquisition, each tracking beam is modulated at a different non-harmonic frequency as disclosed above. In this embodiment, data would be transmitted via the center beam while the outer tracking beams are continuously sampled for pointing error signals.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,
What is claimed is:

1. A satellite communications system comprising:

first means for transmitting a plurality of unidirectional first beams of electromagnetic radiation, each beam having a unique characteristic relative to any other transmitted beam and illuminating a coverage area;

second means for receiving at least one of the first beams and for providing an intermediate signal in response thereto, the intermediate signal having a characteristic which is directly related to the unique characteristic of the received first beam;

third means for transmitting a second beam of electromagnetic energy which has information therein relating to the unique characteristic of the intermediate signal;

fourth means for receiving the second beam and extracting the information therefrom;

fifth means for processing the information and providing a beam coverage control signal in response thereto; and sixth means for controlling the coverage of at least one of the first beams in response to the beam coverage control signal.

2. The invention of claim 1 wherein the first means includes a plurality of optical fibers and the electromagnetic radiation is light.

3. The invention of claim 2 wherein each fiber transmits a beam generated by an associated optical transmitter.

4. The invention of claim 2 wherein the unique characteristic is frequency.

5. The invention of claim 4 wherein the second means includes an optical receiver.

6. The invention of claim 5 wherein the third means includes an optical transmitter.

7. The invention of claim 6 wherein the fourth means includes an optical receiver.

8. The invention of claim 7 wherein the fifth means includes means for detecting the frequency of the second beam.

9. The invention of claim 8 wherein the sixth means includes means for changing the coarse pointing angle of the fibers and means for changing the fine pointing angle of the fibers.

10. A satellite communication system comprising first and second transceiver systems disposed on first and second satellites respectively, each transceiver including:

first means for transmitting first, second, third and fourth optical beams of first, second, third and fourth modulations, respectively, each beam illuminating a coverage area;

second means for receiving at least one of the optical beams and providing an intermediate signal in response thereto, the intermediate signal having a modulation which is directly related to the modulation of the received optical beam;

third means for transmitting the intermediate signal in a fifth optical beam;

fourth means for receiving the fifth beam and extracting the intermediate signal therefrom;

fifth means for processing the intermediate signal and providing a beam coverage control signal in response thereto; and sixth means for controlling the coverage of at least one of the first beams in response to the beam coverage control signal.

11. A method for communication between satellites including the steps of:

transmitting a plurality of unidirectional first beams of electromagnetic radiation, each beam having a unique characteristic relative to any other transmitted beam and illuminating a coverage area;

receiving at least one of the first beams and providing an intermediate signal in response thereto, the intermediate signal having a characteristic which is directly related to the unique characteristic of the received first beam;

transmitting a second beam of electromagnetic energy which has information therein relating to the unique characteristic of the intermediate signal;

receiving the second beam and extracting the information therefrom;

processing the information and providing a beam coverage control signal in response thereto; and controlling the coverage of at least one of the first beams in response to the beam coverage control signal.

* * * * *